(12) United States Patent
Ewasko et al.

(10) Patent No.: US 7,419,729 B2
(45) Date of Patent: Sep. 2, 2008

(54) MULTILAYERED FERROMAGNETIC LAMINATE HAVING ALTERNATING COBALT ALLOY AND IRON-NITROGEN ALLOY FILMS FOR USE WITH MAGNETIC HEADS

(75) Inventors: Ricky Lee Ewasko, Boulder, CO (US); Robert Wayne Nix, Firestone, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 11/863,371

(22) Filed: Sep. 28, 2007

(65) Prior Publication Data

US 2008/0019044 A1    Jan. 24, 2008

Related U.S. Application Data

(62) Division of application No. 10/862,288, filed on Jun. 7, 2004, now Pat. No. 7,289,297.

(51) Int. Cl.
*G11B 5/66* (2006.01)
(52) U.S. Cl. .................. 428/827; 428/828; 428/829; 428/635; 428/679
(58) Field of Classification Search .............. 428/827, 428/829, 828, 635, 679
See application file for complete search history.

(56) References Cited

U.S. PATENT DOCUMENTS

| | | | |
|---|---|---|---|
| 3,975,772 A | 8/1976 | Lin | |
| 4,610,935 A | 9/1986 | Kumasaka et al. | |
| 4,748,089 A | 5/1988 | Kumasaka et al. | |
| 4,858,049 A | 8/1989 | Kobayashi et al. | |
| 5,264,981 A | 11/1993 | Campbell et al. | |
| 6,238,492 B1* | 5/2001 | Nakanishi et al. | 148/306 |
| 6,602,621 B2* | 8/2003 | Matsunuma et al. | 428/827 |
| 6,815,098 B2* | 11/2004 | Matsunuma et al. | 428/828 |
| 7,023,658 B1 | 4/2006 | Knapp et al. | |
| 7,177,117 B1 | 2/2007 | Jiang et al. | |
| 2003/0162057 A1* | 8/2003 | Matsunuma et al. | 428/694 TS |
| 2004/0110034 A1* | 6/2004 | Kawada | 428/694 R |
| 2004/0150912 A1 | 8/2004 | Kawato et al. | |
| 2004/0253485 A1* | 12/2004 | Nolan | 428/694 T |
| 2008/0019044 A1* | 1/2008 | Ewasko et al. | 360/110 |

* cited by examiner

*Primary Examiner*—Holly Rickman
*Assistant Examiner*—Gary Harris
(74) *Attorney, Agent, or Firm*—Brooks Kushman P.C.

(57) ABSTRACT

A multilayered ferromagnetic laminate includes a first magnetic film having a cobalt alloy and a second magnetic film having an iron-nitrogen alloy. The films are deposited upon one another and laminated to provide a multilayered film structure having an alternating plurality of the first and second magnetic films. The cobalt alloy may be a cobalt-zirconium-tantalum alloy. The nitrogen is incorporated interstitially in the crystalline structure of the iron of the second magnetic film. The laminate forms the magnetic shields and the write poles of magnetic disk and tape heads. The lamination of the first magnetic film which has high electrically resistive, high mechanical hardness, and high magnetic moment characteristics with the second magnetic film which has lower electrically resistive and very high magnetic moment characteristics yields the laminate which has very high magnetic moment and very hard pole material characteristics and has the ability to write at high frequencies.

12 Claims, 2 Drawing Sheets

| | | | | | |
|---|---|---|---|---|---|
| Hard | Freq: 10. Hz | H Sens: 5.0 Oe | V Sens: 100. nW |
| Easy | Freq: 2.0 Hz | H Sens: 2.0 Oe | V Sens: 100. nW |

MULTILAYERED FERROMAGNETIC LAMINATE HAVING ALTERNATING COBALT ALLOY AND IRON-NITROGEN ALLOY FILMS FOR USE WITH MAGNETIC HEADS

CROSS-REFERENCE TO RELATED APPLICATIONS

This is a divisional application of U.S. application Ser. No. 10/862,288, filed Jun. 7, 2004, now U.S. Pat. No. 7,289,297, which is hereby incorporated by reference in its entirety.

BACKGROUND OF THE INVENTION

1. Field of the Invention

The present invention relates generally to magnetic heads and, more particularly, to a multilayered ferromagnetic laminate having alternating cobalt alloy and iron-nitrogen alloy films deposited upon one another for use as shield or pole material in magnetic disk and tape heads.

2. Background Art

Materials used as magnetic sensor shields and inductive write poles in magnetic transducers such as magnetic disk and tape heads require a variety of optimized physical, electrical, and magnetic properties to assure proper performance. These optimal properties include soft, stable magnetic properties, proper wear, high magnetic moment, and corrosion resistance. High frequency write capability is required for write pole materials.

A high saturation magnetization and high permeability alloy for the write pole of a magnetic transducer provides high density recording, especially with respect to the ability to write to high coercivity recording mediums.

The magnetic film structures may be constructed from a laminated structure having a plurality of magnetic layers as disclosed in U.S. Pat. No. 4,610,935. This patent describes a laminated thin film structure having a plurality of magnetic layers containing iron or cobalt (Co) as the principal constituent and an intermediate very thin layer of a nickel-iron alloy or an amorphous magnetic alloy. A plurality of the laminated layers can be placed together separated by a nonmagnetic isolation layer. Nitrogen (N) is not included as a component of any of the layers.

U.S. Pat. No. 4,748,089 describes a magnetic head having at least a portion of its pole pieces formed of a multilayered laminate of main and spacer magnetic films. The main magnetic film is a binary system amorphous alloy with its principal constituent being a material selected from the group of cobalt, iron, and nickel. The spacer magnetic film is made from a polycrystalline or amorphous ferromagnetic material. Nitrogen is not included as a component of either magnetic film.

U.S. Pat. No. 4,858,049 describes a magnetic film having ferromagnetic layers of nickel and iron alternated with a layer of iron and nitrogen which is an element that is interstitially soluble in the iron.

U.S. Pat. No. 5,264,981 describes a multilayered ferromagnetic film having alternating layers of iron-nitrogen and nickel-iron-nitrogen alloys. The iron-nitrogen layer is an iron alloy having an element of up to ten atomic percent taken from nitrogen. The nickel-iron-nitrogen layer is a nickel-iron alloy ranging from thirty to hundred atomic percent of nickel with a nitrogen doping. The nitrogen doping level is greater than zero and up to ten atomic percent in nickel-iron.

SUMMARY OF THE INVENTION

Accordingly, it is an object of the present invention to provide a multilayered ferromagnetic laminate having alternating cobalt (Co) alloy and iron-nitrogen (FeN) alloy films for use with magnetic disk and tape heads.

It is another object of the present invention to provide a magnetic head including a write pole formed of a multilayered ferromagnetic laminate having alternating cobalt alloy and iron-nitrogen alloy films.

It is a further object of the present invention to provide a magnetic head including a magnetic sensor shield formed of a multilayered ferromagnetic laminate having alternating cobalt alloy and iron-nitrogen alloy films.

In carrying out the above objects and other objects, the present invention provides a multilayered ferromagnetic laminate having at least one first magnetic film and at least one second magnetic film. Each of the first magnetic films has a cobalt alloy and each of the second magnetic films has an iron-nitrogen alloy. The first and second magnetic films are alternately deposited upon one another and laminated to provide a multilayered film structure having an alternating plurality of the first and second magnetic films.

The cobalt alloy of each of the first magnetic films is preferably a cobalt-zirconium-tantalum (CZT) alloy. Each of the first magnetic films may have a thickness ranging from 50 to 1500 Angstroms, and each of the second magnetic films may have a thickness ranging from 100 to 1500 Angstroms. The multilayered film structure has an alternating plurality between one and any number of first and second magnetic film pairs.

The CZT alloy of each of the first magnetic films may have a cobalt composition of 89% to 93%, a zirconium composition of 1% to 5%, and a tantalum composition of 2% to 8%. Preferably, the CZT alloy of each of the first magnetic films has a cobalt composition of 91.5%, a zirconium composition of 3.5%, and a tantalum composition of 5%. The iron-nitrogen alloy of each of the second magnetic films may have a nitrogen composition of 2% to 6%.

Further, in carrying out the above objects and other objects, the present invention provides a magnetic head. The head includes a substrate and a first magnetic pole deposited on the substrate. The first magnetic pole includes multilayered first and second magnetic films deposited upon one another. The first magnetic film includes a cobalt alloy such as a CZT alloy and the second magnetic film includes an iron-nitrogen alloy. The first and second magnetic films are alternately laminated to provide a multilayered ferromagnetic laminate film structure.

The magnetic head may further include a magnetic insulating layer covering the first magnetic pole and forming a magnetic gap. A second magnetic pole is deposited to create a magnetic circuit with the first magnetic pole. Conductor coils are placed between the first and second magnetic poles to activate the first and second magnetic poles. The second magnetic pole includes the multilayered ferromagnetic laminate film structure.

Also, in carrying out the above objects and other objects, the present invention provides another magnetic head. This head includes a magnetic sensor and at least one magnetic shield for the magnetic sensor. Each shield includes first and second magnetic films deposited upon one another. The first magnetic film has a cobalt alloy such as a CZT alloy and the second magnetic film has an iron-nitrogen alloy. The first and second magnetic films are laminated to provide a multilayered ferromagnetic laminate film structure having an alternating plurality of the first magnetic films and the second magnetic films.

DETAILED DESCRIPTION OF THE PREFERRED EMBODIMENT(S)

Figure 1:
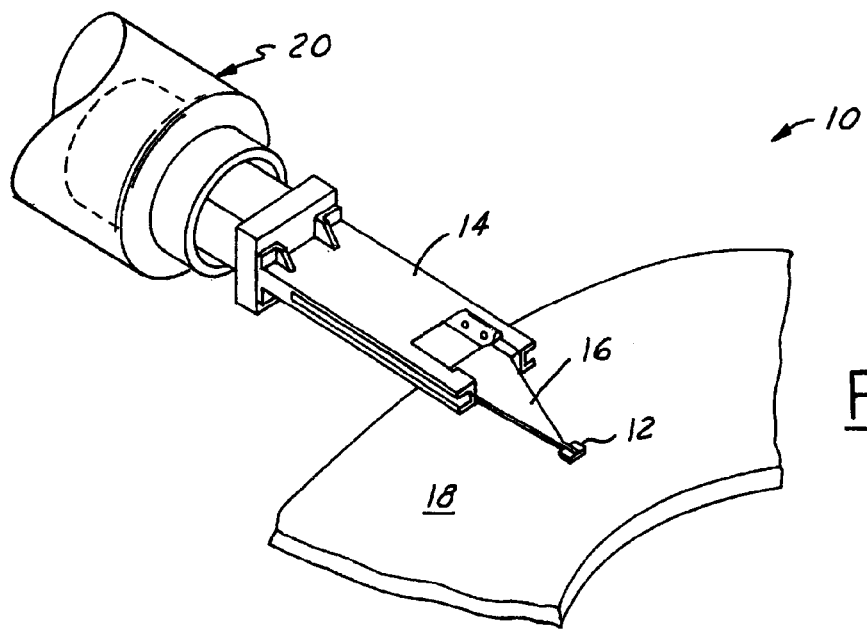
FIG. 1 illustrates a magnetic disk storage system in accordance with the present invention.

FIG. 1 illustrates a magnetic disk storage system 10 in order to illustrate the usage of the multilayered ferromagnetic laminate in accordance with the present invention. Storage system 10 includes a magnetic head 12 attached to an actuator arm 14 via a suspension arm 16. Suspension arm 16 supports at its end magnetic head 12. Magnetic head 12 includes a magnetic transducer 24 (shown in FIG. 2) which has a transducing gap in transducing relationship with the surface of a magnetic disk 18. Electrical signals are conducted from magnetic head 12 read and write to magnetic disk 18. Actuator arm 14 is attached to an actuator 20 for accessing magnetic head 12 to tracks on magnetic disk 18.

Figure 2:
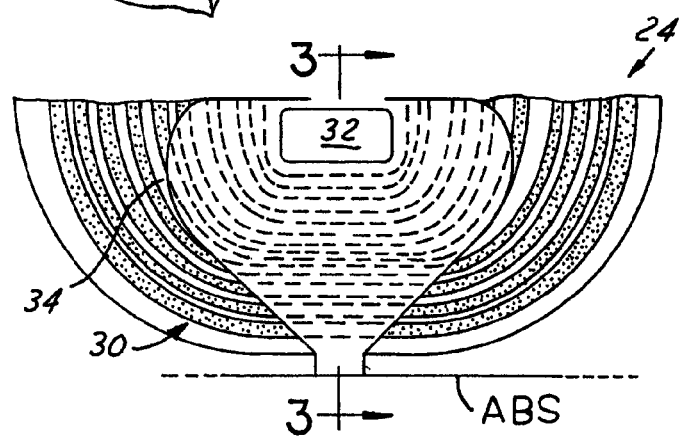
FIG. 2 illustrates a side elevation view of a magnetic transducer of the magnetic disk storage system illustrated in FIG. 1.

As shown in FIG. 2, magnetic transducer 24 is deposited onto a slider 22 (shown in FIG. 3) at an air bearing surface (ABS) such that the magnetic transducer is in a transducing relationship with the surface of magnetic disk 18. Magnetic transducer 24 includes output conductors (not shown) for conduction of the electrical signals to and from the magnetic transducer.

Figure 3:
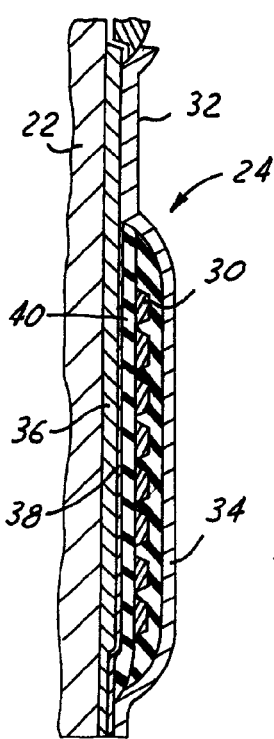
FIG. 3 illustrates a cross-sectional view of the magnetic transducer illustrated along the line 3-3 of FIG. 2.

With reference to FIG. 2, FIG. 3 illustrates a cross-sectional view of magnetic transducer 24 along the lines 3-3 of FIG. 2. Magnetic transducer 24 includes conductors 30 wrapped around a back gap 32 of the magnetic transducer to top write pole 34 and bottom write pole 36. Magnetic transducer 24 is deposited directly onto slider 22. Magnetic transducer 24 also includes a magnetic gap layer 38 and an insulation layer 40 to insulate conductors 30 from top and bottom write poles 34 and 36.

Figure 4:
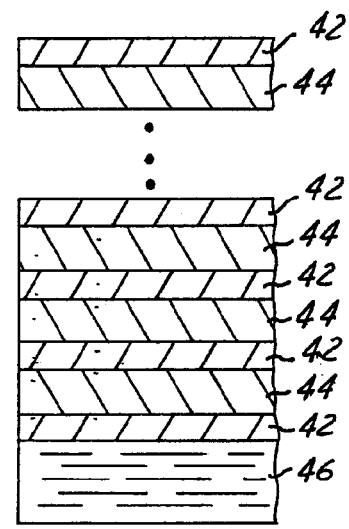
FIG. 4 illustrates a cross-sectional view of a multilayered ferromagnetic laminate in accordance with the present invention.

Referring now to FIG. 4, a cross-sectional view of a multilayered ferromagnetic laminate 40 in accordance with the present invention is shown. In accordance with the present invention, either or both of top and bottom write poles 34 and 36 of magnetic transducer 24 are formed of multilayered ferromagnetic laminate 40. Multilayered ferromagnetic laminate 40 includes alternating layers of a first magnetic film 42 and a second magnetic film 44 which are deposited upon one another and laminated together. Both layers of first and second magnetic films 42 and 44 are laminated onto a substrate 46 which could be the wafer which becomes slider 22.

Each layer of first magnetic film 42 includes as its principal component a cobalt alloy. Each layer of first magnetic film 42 has a thickness ranging from 50 to 1500 Angstroms. The cobalt alloy of each layer of first magnetic film 42 is preferably a cobalt-zirconium-tantalum (CZT) alloy. The CZT alloy of each layer of first magnetic film 42 has a cobalt composition of 89% to 93%, a zirconium composition of 1% to 5%, and a tantalum composition of 2% to 8%. Preferably, the CZT alloy of each layer of magnetic film 42 has a cobalt composition of 91.5%, a zirconium composition of 3.5%, and a tantalum composition of 5%. The cobalt alloy and the CZT alloy provide high electrically resistive, high mechanical hardness, and high magnetic moment characteristics.

Each layer of second magnetic film 44 includes as its principal component an iron-nitrogen alloy. Each layer of second magnetic film 54 has a thickness ranging from 100 to 1500 Angstroms. The iron-nitrogen alloy of each layer of second magnetic film 54 has a nitrogen composition of 2% to 6%. The nitrogen is incorporated in interstitially in the crystalline structure of the iron. The iron-nitrogen alloy provides lower electrically resistive and very high magnetic moment characteristics.

As shown in FIG. 4, there are nine layers of first and second magnetic films 42 and 44 in multilayered ferromagnetic laminate 40. These nine layers includes five layers of first magnetic film 42 and four layers of second magnetic film 44. As such, these nine layers include four pairs of first and second magnetic films 42 and 44 and an additional layer of the first magnetic film. The layers of first and second magnetic films 42 and 44 are deposited upon one another and laminated together to provide a multilayered film structure having an alternating plurality of the first magnetic films and the second magnetic films. That is, the five layers of first magnetic film 42 sandwiches the four layers of second magnetic film 44 in between the layers of the first magnetic film. Each layer 42 and 44 is deposited in turn to form the total multilayered ferromagnetic laminate structure 40. Multilayered ferromagnetic laminate 40 may have between one and any number of laminated pairs of first and second magnetic films 42 and 44.

The lamination of first magnetic film 42 which has high electrically resistive, high mechanical hardness, and high magnetic moment characteristics with second magnetic film 44 which has lower electrically resistive and very high magnetic moment characteristics yields a laminate structure 40 having very high magnetic moment and very hard pole material characteristics and having the ability to write at high frequencies in the megahertz range. Laminate structure 40 also has excellent wear properties. When used to form a write pole, the very high magnetic moment results in less pole material that has to be deposited which may simplify or improve processing such as pole track width definition.

Figure 5:
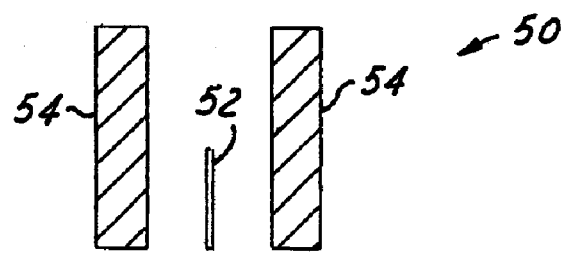
FIG. 5 illustrates a side cross-sectional view of a magnetic head having two magnetic shields with each magnetic shield formed of the multilayered ferromagnetic laminate in accordance with the present invention.

Referring now to FIG. 5, another magnetic head 50 in which laminate structure 40 in accordance with the present invention may be employed is shown. Magnetic head 50 includes a magneto-resistive (MR) read sensor element 52 shielded by a pair of magnetic shields 54. Each magnetic shield 54 is formed of laminate structure 40. As such, each magnetic shield 54 is formed of a plurality of stacked and alternately laminated first and second magnetic films 42 and 44. Accordingly, it is to be appreciated that laminate structure 40 may generally be used for shield and pole materials of magnetic disk and tape heads.

Figure 6:
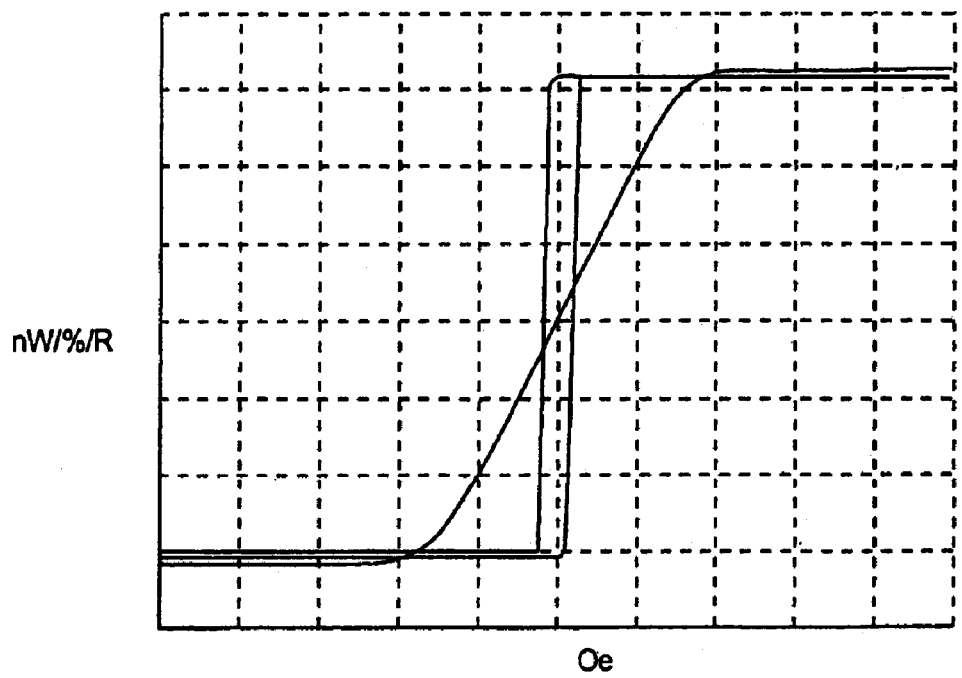
FIG. 6 illustrates a B-H magnetic measurement loop of a five layer multilayered ferromagnetic laminate in accordance with the present invention.

Referring now to FIG. 6, a B-H magnetic measurement loop of a five layer multilayered ferromagnetic laminate in accordance with the present invention is shown. The magnetic measurement loop of FIG. 6 is for a multilayered ferromagnetic laminate having a CZT alloy for the first magnetic film.

Thus, it is apparent that there has been provided, in accordance with the present invention, a multilayered ferromagnetic laminate having alternating cobalt alloy and iron-nitrogen alloy films deposited upon one another for use with magnetic disk and tape heads that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A multilayered ferromagnetic laminate comprising:
   a plurality of first magnetic films each having a cobalt-zirconium-tantalum alloy; and
   a plurality of second magnetic films each having an iron-nitrogen alloy;
   wherein the first and second magnetic films are alternatively laminated directly upon one another to form a plurality of layers with each layer including one of the first magnetic films and one of the second magnetic films in direct contact with one another.

2. The laminate of claim 1 wherein:
   the cobalt-zirconium-tantalum alloy has a cobalt composition of 89% to 93%, a zirconium composition of 1% to 5%, and a tantalum composition of 2% to 8%.

3. The laminate of claim 2 wherein:
   the iron-nitrogen alloy has a nitrogen composition of 2% to 6%.

4. The laminate of claim 1 wherein:
   the iron-nitrogen alloy has a nitrogen composition of 2% to 6%.

5. The laminate of claim 1 wherein:
   each first magnetic film has a thickness ranging from 50 to 1500 Angstroms.

6. The laminate of claim 1 wherein:
   each second magnetic film has a thickness ranging from 100 to 1500 Angstroms.

7. A multilayered ferromagnetic laminate comprising:
   a first magnetic film having a cobalt-zirconium-tantalum alloy; and
   a second magnetic film having an iron-nitrogen alloy;
   the first and second magnetic films being alternately deposited directly upon one another and laminated to provide a multilayered film structure having alternating first and second magnetic films which are in direct contact with one another.

8. The laminate of claim 7 wherein:
   the cobalt-zirconium-tantalum alloy has a cobalt composition of 89% to 93%, a zirconium composition of 1% to 5%, and a tantalum composition of 2% to 8%.

9. The laminate of claim 8 wherein:
   the iron-nitrogen alloy has a nitrogen composition of 2% to 6%.

10. The laminate of claim 7 wherein:
    the iron-nitrogen alloy has a nitrogen composition of 2% to 6%.

11. The laminate of claim 7 wherein:
    the first magnetic film has a thickness ranging from 50 to 1500 Angstroms.

12. The laminate of claim 7 wherein:
    the second magnetic film has a thickness ranging from 100 to 1500 Angstroms.

* * * * *